United States Patent [19]

Mohr

[11] 3,830,526

[45] Aug. 20, 1974

[54] APPARATUS AND METHOD FOR MAKING SUB-SEA CONNECTIONS

[75] Inventor: Harvey O. Mohr, Houston, Tex.

[73] Assignee: Hydrotech International, Inc., Houston, Tex.

[22] Filed: Apr. 26, 1973

[21] Appl. No.: 354,525

[52] U.S. Cl. .............................................. 285/18
[51] Int. Cl. .......................................... F16l 35/00
[58] Field of Search ......... 285/18, 16, 17, 171, 172, 285/140, 391

[56] References Cited
UNITED STATES PATENTS

| | | | |
|---|---|---|---|
| 2,620,554 | 11/1971 | Ward | 285/18 |
| 3,704,033 | 11/1972 | Arnold | 285/18 |
| 3,795,115 | 3/1974 | Bergquist et al. | 285/18 |

Primary Examiner—Patrick D. Lawson

[57] ABSTRACT

Method and apparatus for making a connection to the end of a pipe, such as the coupling of two ends of pipe in an underwater environment and wherein there is a possibility of misalignment between the axes of the coupling and the pipe or pipes. The method includes forming a generally tubular shaped coupling having two facing and axially spaced apart tapered bowls therein. The coupling is mounted over the end of the pipe to which a connection is to be made in an underwater location, with the bowls being spaced radially adjacent the outside surface of the pipe. A plurality of wedged shaped gripping slips are supported in the annular space between the coupling and the pipe at circumferentially spaced apart positions and adjacent each of the bowls, with each of the slips having a tapered outer surface matching the taper of the adjacent bowl whereby the slips are arranged for being cammed radially inward by the bowl when the slips are urged axially therealong. The slips are then urged varying axial and radial distances into gripping engagement with the pipe by applying an axial biasing force to each of the slips, whereby each of the slips of each of the pluralities of slips are all urged to gripping positions to substantially uniform gripping engagement regardless of any variation in size of the annular space between the coupling and the pipe, to thereby accommodate any misalignment between the aforesaid axes. The aforesaid axial force is preferably applied by mounting an annular elastomeric member proximate the butt end of the slips and axially compressing the elastomeric members, whereby each of the members applies an axial biasing force to the slips in one of the pluralities of slips. The method is preferably carried out by mounting a deformable thrust ring adjacent each axial end of each elastomeric member to facilitate the transmission of the aforesaid axial force. The axial force may be applied by supporting a plurality of axially movable pistons adjacent the axial ends of the two most adjacent thrust rings.

The apparatus of this invention is arranged for making a connection to a generally horizontally extending pipe in an underwater environment. It includes a tubular coupling arranged for mounting over the end of the pipe, with the coupling having two axially spaced apart and facing tapered bowls formed therein. The housing is provided with a plurality of longitudinally aligned cylinders circumferentially spaced about intermediate bowls. At least one axially slidable piston is mounted on each of the cylinders, with each of the pistons being arranged to move in an axial direction in response to hydraulically actuated force applied thereto. A plurality of wedged shaped slips are circumferentially spaced about and mounted adjacent each of the bowls, with each of the slips having a tapered outer surface arranged for mating with the taper of the adjacent bowl, and a gripping surface on the radially inward side thereof. The coupling includes a pair of elastomeric members mounted in the annular space between the coupling and the pipe, with each of the elastomeric members being axially proximate one of the pluralities of slips on one end thereof and with the other end thereof being proximate the ends of several of the pistons. A pair of deformable thrust rings is mounted in the annular space between the coupling and the pipe, with each of the rings being arranged for abutment against one of the elastomeric members on one side thereof and arranged for contact by several of the pistons on the other end thereof. Means are provided for applying hydraulically actuated force to the coupling to thereby urge several of the pistons in said pluralities of pistons in one axial direction against one of the thrust rings and several of the pistons in the opposite axial direction against the other of said thrust rings, thereby axially deforming the thrust rings and axially compressing the elastomeric members and thereby urging each of the slips in each of the pluralities of slips varying axial and radial distances into gripping engagement with the pipe, regardless of any variations in the size of the annular space between the coupling and the pipe.

7 Claims, 3 Drawing Figures

APPARATUS AND METHOD FOR MAKING SUB-SEA CONNECTIONS

BACKGROUND OF THE INVENTION

*a. Field of the Invention*

This invention relates to an apparatus and method for making a connection to a generally horizontally extending pipe in an underwater location. It may also be useful for connecting two pipes held in a generally end to end relationship in an underwater environment.

*b. Description of the Prior Art*

The making of a connection between two pieces of pipe in a subsea environment is an extremely difficult and expensive operation, normally. Marine surface support equipment is an expensive commodity, and diving personnel and/or pre-program installation equipment is extremely costly. All underwater work must be carefully planned, and divers are often used who have a very minimal amount of skill of very specialized nature. In deeper water this is more important since often a procession of divers is used to accomplish a given piece of work. In addition, zero visibility must be anticipated. All of these conditions prevent a diver or workman from being able to make any detailed quantitative judgmental decisions as to the progress of the work.

Heretofore, hydraulically actuated couplings have been used for making the aforesaid underwater connections. Typical examples of these prior art underwater couplings are shown in U.S. Letters Pat. Nos.: 3,393,926 and 3,707,025.

Generally, couplings of the aforesaid type employ segmented slips and a matching bowl assembly and are arranged such that the slips are urged into mechanical engagement with the pipe to which the connection is to be made. However, with this type of coupling, it is necessary to have the inside diameter of the pipeline connector slightly larger than the pipeline to facilitate placement of the connector over the end of the pipeline. However, because of this slightly larger size, it is possible for the pipeline to be decentered inside of the coupling, which quite often occurs in an underwater environment and which may not be easily detectable for reasons noted above. This decentering usually occurs on opposite sides of the pipe at opposite ends of the connector, and such a decentering has been found to occur with a high probability of occurrence in most underwater pipeline connecting operations.

When two connectors are used, such as those taught in U.S. Pat. No. 3,707,025, and which two couplings are held together by tilted flanges as taught in the aforesaid patent, it is necessary that the pipe connectors be positioned such that the tilted flanges are aligned properly to allow connection to be made. To maintain this proper alignment of the tilted flanges, which are arranged to accommodate major misalignment between the two pipes being connected, it is desirable to make the flanges up first and subsequently activate the slip and bowl mechanisms of the two connectors to attach them firmly to the respective pipes. However, when this center connection is first made, the two connectors then act as one unit and are no longer totally free to allow the slip mechanism to center the pipe inside of each of the connectors. After the first connector is set, the entire system of two connectors, the center connection, and one pipeline are now an immobile mass, and centering action by the slips in the last connector is virtually impossible.

Experience has shown that unless extreme care is taken under the above described conditions, at least one of the connectors will be improperly attached to the pipeline, and on occasion, both connectors may be improperly set. An analysis of the failures shows that in a decentered position, the segments of slips which are nearest to the pipeline by virtue of the misalignment, tend to bottom out first and are wedged between the pipeline and the bowl before contact is made on the opposite set of slips with the pipeline. Since the connector and the pipeline are held so that no centering action is possible by the slips, only the first set to make contact actually engage and hold the pipe. Consequently, when the mechanism is locked into position, it is being held with only a small portion of the total number of slips necessary to properly hold the pipe. The aforesaid misalignment may sometimes be referred to herein as a "bind condition."

It has been found that this "bind condition" quite often arises in an underwater location after the aforesaid tilted flanges are made up because the ends of the horizontally extending pipe and couplings can sink, causing the pipe to be decentered at the rear end of each of the couplings and decentered at 180° away at the front end of each of the couplings. In other words, the pipe travels through the center of each of the couplings at the maximum angle allowable by the difference in diameter between the coupling and the pipe, thus resulting in the aforesaid "bind condition." When this occurs, the slip segments are not all in engagement with the pipe and the gripping means are usually inadequate. Furthermore, the packers adjacent to the slips that create the seal are not likely to be set due to the fact that a large portion of the packer has no slips pressed thereagainst to thereby provide the axial compressions. The result has been a high proportion of failures when using the aforesaid prior art type couplings and methods.

SUMMARY OF THE INVENTION

It is therefore an object of this invention to provide an improved method and apparatus for making a connection to a generally horizontally extending pipe in an underwater location.

The method of this invention is for making a connection to a pipe in an underwater environment and wherein the pipe may be positioned with the longitudinal axis thereof generally in a horizontal relationship. A tubular shaped coupling is formed having two facing and axially spaced apart tapered bowls therein. The coupling is mounted over the end of the pipe in the underwater location with the bowls being radially adjacent the pipe. A plurality of wedged shaped gripping slips is supported in the annular space between the coupling and the pipe at circumferentially spaced apart positions adjacent each of the bowls, with each of the slips having tapered outer surfaces matching the taper of the adjacent bowl, whereby the slip is arranged for being cammed radially inward by the bowl when the slip is urged axially therealong. The slips in each of the pluralities are moved varying axial and radial distances into gripping engagement with the pipe by applying an axial biasing force to each of the slips, whereby the slips in each of the pluralities are all urged to gripping positions to substantially uniform gripping engagement with the adjacent pipe surface regardless of any variation in the size of the annular space between the couplings and the pipe, which might occur in the aforesaid "bind condition." The method may include mounting an annular elastomeric member proximate the butt ends of each of the pluralities of slips and thereafter axially compressing the elastomeric member whereby each of the members applies an axial biasing force to the slips in one of the pluralities of slips. Preferably, the method includes mounting a deformable thrust ring adjacent each axial end of each of the elastomeric members and applying the axial force to said thrust members. It is to be understood that for the purposes of this application, the words "deformable thrust ring" shall be construed to mean either an undersized thrust ring which is capable of tilting and thereby assuming a position wherein the plane of the thrust ring is at an angle greater or less than a right angle with respect to the longitudinal axis of the couplings, or the term may be applied to a thrust ring made of a flexible material such that the major portion thereof may be moved out of a plane which is perpendicular to the central longitudinal axis of the coupling.

The aforesaid axial thrust may be applied to the thrust rings by a plurality of circumferentially spaced apart pistons such as the pistons shown in U.S. Pat. No. 3,704,033, for example. In certain embodiments, the method may include the steps of joining two pieces of pipe and wherein one coupling assembly is utilized, which coupling assembly may be a unitary coupling or which may be comprised of two couplings of the aforesaid type.

The apparatus of this invention is arranged for making a connection to the end of a generally horizontally extending pipe in an underwater environment and includes a tubular coupling arranged for mounting over the end of the pipe, with the coupling having two axially spaced apart and facing tapered bowls formed therein. Preferably, the coupling has a plurality of longitudinally aligned cylinders circumferentially spaced about intermediate the bowls. At least one axially slidable piston is mounted in each of the cylinders with each of the pistons being arranged to move in an axial direction in response to hydraulically actuated force applied thereto. A plurality of wedge shaped slips are circumferentially spaced about and mounted adjacent each of the bowls, with each of the slips having a tapered outer surface arranged for mating with the taper of the adjacent bowls and a gripping surface on the radially inward side thereof. A pair of elastomeric annular members is mounted in the annular space between the coupling and the pipe, with each of the members being axially proximate one of the pluralities of slips on one end thereof and with the other end thereof being proximate the ends of several of said pistons. A pair of deformable thrust rings of the aforesaid type are mounted in the annular space between the coupling and the pipe, with each of the rings being arranged for abutment against one of the elastomeric members on one side thereof and arranged for contact by several of the pistons on the other end thereof. The coupling includes means for applying hydraulically actuated force to the coupling to thereby urge several of the pistons in said plurality of pistons in one axial direction against one of the aforesaid thrust rings and several of the pistons in the opposite axial direction against the other of the said thrust rings to thereby axially deform the thrust rings, axially compress the elastomeric members and urge each of the slips in each of the pluralities of slips varying axial and radial distances into gripping engagement with the pipe regardless of any variations in the size of the annular space between the coupling and the pipe. Preferably the apparatus will also include another pair of deformable thrust rings mounted in the annular space, with each of the other pair of rings being supported between one of the elastomeric members and one of the plurality of slips for transmitting axial force therethrough. It is to be understood that the term "elastomeric member" may be a unitary tubular shaped member of rubber or the like, or may be comprised of several rings of elastomeric material acting as a unitary tubular rubber member.

DESCRIPTION OF THE PREFERRED EMBODIMENT

Figure 1:
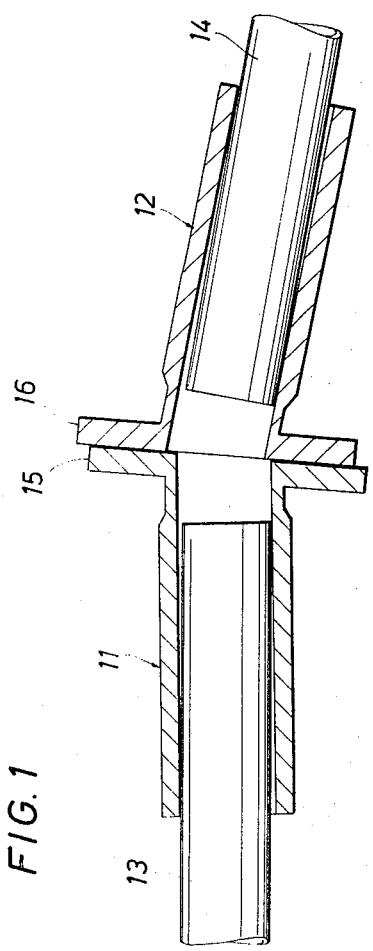
FIG. 1 is a central sectional view of a pair of couplings mounted on the ends of two pipes which are to be connected in an underwater location and prior to the completion of the installation.

Referring now to the drawing, a pair of couplings 11 and 12 are shown mounted respectively over the ends of pipes 13 and 14. Each of the couplings 11 and 12 may have means on the proximate ends thereof for coupling together, which coupling means may be tilted flanges 15 and 16, one or both of which may be rotatable about the longitudinal central axis of the coupling on which it is mounted and may be of the type shown in U.S. Pat. No. 3,707,025. Other connecting means may be utilized such as a ball and socket connection, or the couplings can be formed into one unitary tubular connection assembly.

In attempting to initially connect flanges 15 and 16 together, they will be normally rotated relative to each other so as to occupy the same plane. However, because of the aforesaid "bind condition," which quite often arises, the respective flanges will not be perfectly aligned for various reasons. Hence, it is sometimes necessary to physically force the flanges 15 and 16 to a generally matching condition, as described above, with the result that the aforesaid "bind condition" usually arises with the attendant difficulties and problems as explained above.

Figure 2:
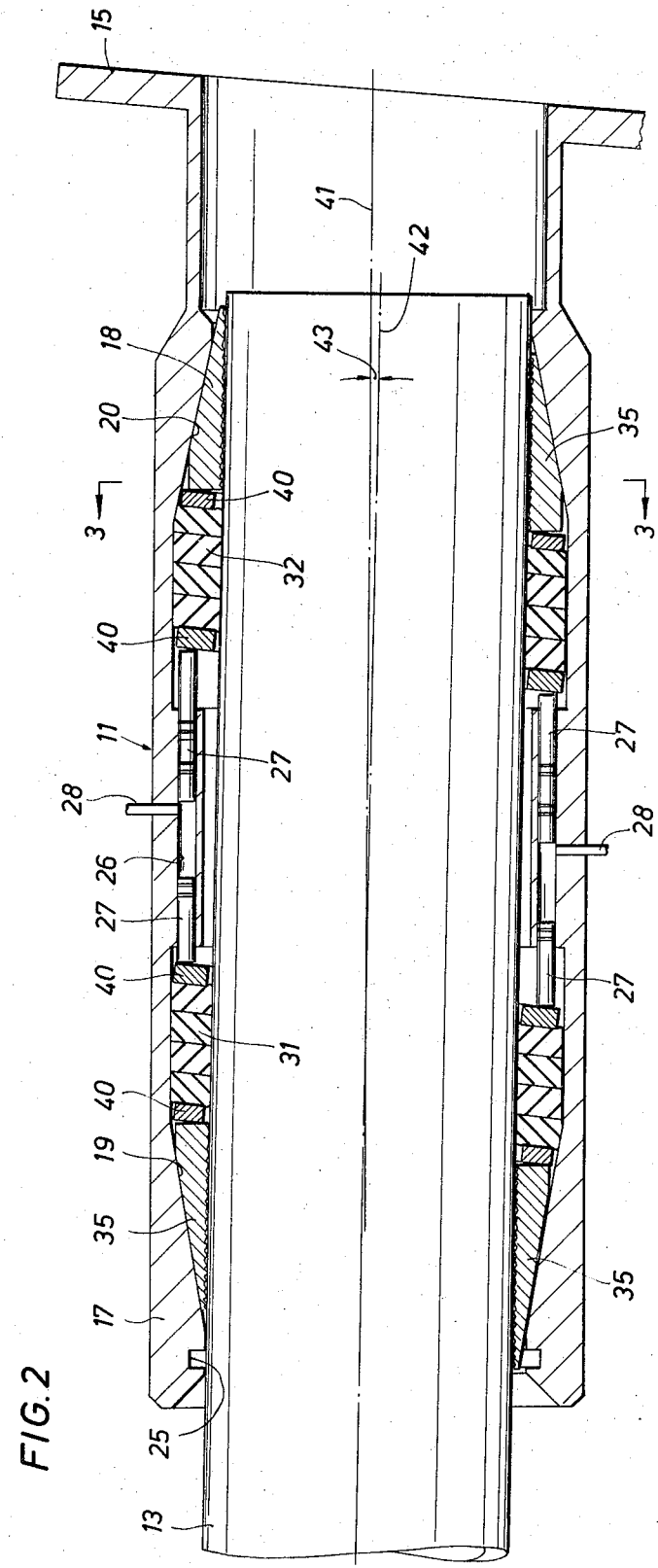
FIG. 2 is an enlarged view of one of the couplings shown in FIG. 1, but showing the slips actuated to the set condition and showing the misalignment between the central axis of the coupling and the pipe, and with the slips urged varying axial and radial distances to have substantially uniform gripping engagement with the pipe.

Referring now to FIG. 2, details of the present invention are shown which overcome the aforesaid "bind condition." In the FIG. 2 embodiment, the slips are shown actuated to the set position. Prior to actuation, however, it is to be understood that the slips, which will be described in greater detail hereinafter, are held in the retracted position.

Coupling 11 has a pair of axially spaced apart bowls 17 and 18, having tapered annular inward surfaces 19 and 20, respectively. The outward end of coupling 11 may have an annular inwardly facing recess 25 to accommodate an axially actuated seal to prevent incursion of salt water as is well known in the prior art.

The coupling 11 includes a plurality of circumferentially spaced about and generally axially extending cylinders 26, each of which may have one or more axially slidable pistons 27 mounted therein for axial movement in response to hydraulic fluid pressure applied through valved inlets 28. Pistons 27 may be of the type shown in U.S. Pat. No. 3,704,033.

Coupling 11 includes a pair of elastomeric annular members 31 and 32 mounted between the internal surface of coupling 11 and the external surface of pipe 13. Each of the members 31 and 32 is conveniently comprised of a plurality of elastomeric rings, which may be of rubber or the like and which are capable of transmitting axial thrust force upon axial compression thereof and may conveniently expand in a radial direction to perform a sealing function between coupling 11 and pipe 13.

Figure 3:
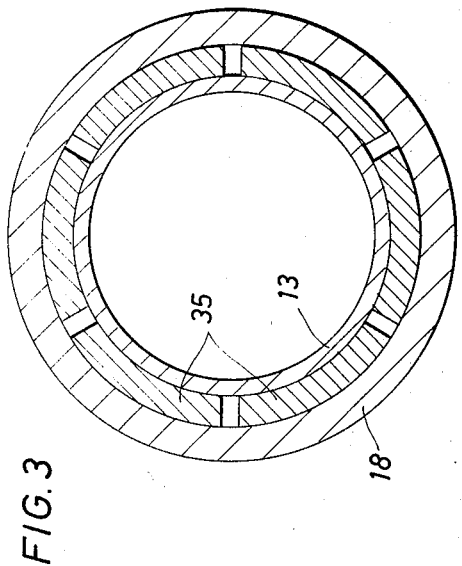
FIG. 3 is a cross-sectional view taken generally along line 3—3 of FIG. 2.

Each of the tapered bowl surfaces 19 and 20 have supported circumferentially thereabout and adjacent thereto a plurality of tapered slips 35, which have tapered radially outward sides and gripping radially inward sides which are arranged for gripping engagement with the external surface of pipe 13. As shown in FIG. 3, each of the slips 35 is discrete and hence arranged for axial travel varying distances to accommodate the aforesaid "bind condition."

Each of the elastomeric members 31 and 32 has mounted on each axial end thereof two deformable thrust rings 40. The two thrust rings 40 which are most axially proximate are arranged for engagement by several of the pistons 27. The two thrust rings 40, which are axially spaced apart the farthest distance, are arranged for contact with the butt ends of the respective adjacent slips 35.

Thrust rings 40 are described as being deformable because they are undersized with respect to the inside diameter of coupling 11 and oversized with respect to the outside diameter of pipe 13. Being dimensioned, they can therefore tilt as required so as to have substantially uniform thrust applied circumferentially thereabout. As stated above, thrust rings 40, rather than being under-sized or oversized, could be made of a flexible material, as for example thin metal, and actually assume a shape wherein the major plane of the ring would become tilted in the same fashion as the ring 40 and serve the same purpose. Hence, the term "deformable" shall be used herein to describe either or both of the aforesaid conditions.

In operation, the couplings 11 and 12 would be initially mounted on pipes 13 and 14 in the manner shown in FIG. 1. Pistons 27, thrust rings 40, elastomeric members 31 and 32, and slip 35 would all be held in a retracted position such that coupling 11 can readily be slid over the end of pipe 13, and likewise coupling 12 can be slid over the end of pipe 14. Thereafter, flanges 15 and 16, for example, would be rotated to be in the same plane and thereafter rigidly connected together. Thus connected, pressurized hydraulic fluid is applied to inlets 28, which causes pistons 27 to move in an axial direction, thereby engaging the adjacent thrust rings 40, which in turn axially compress elastomeric members 31 and 32, which in turn applies an axial force to the other two thrust rings 40, which in turn urge slips 35 in an axial direction varying axial distances, whereby they are cammed radially inwardly into gripping engagement with the pipe 13 by the adjacent tapered surface 19 or 20.

It will be noted that as shown FIG. 2, the coupling 11 is in the aforesaid "bind condition" with respect to the pipe 13 by virtue of the fact that centerline 41 of coupling 11 is misaligned with centerline 42 of pipe 13 by the amount of misalingment angle 43, which is shown by the opposed arrows.

It will thus be apparent that there is hereby provided a method and apparatus which will be useful in making a completion where the couplings are likely to become in a bind or misaligned condition with respect to the pipe to which the connection is being made. By arranging the apparatus such that the slips can move varying axial and radial distances, a means is provided to accommodate for the aforesaid bind conditions and still insure that all of these slips are urged to a generally uniform engagement regardless of any variation in the annular space between the coupling and the pipe. The result has been that the art is now provided with an improved method and apparatus for making connections of the aforesaid type to thereby assure a higher ratio of successes and lower ratio of failures in such installations.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a method of making a connection to a pipe in an underwater environment wherein said pipe is positioned with the longitudinal axis thereof in generally horizontal relationship, the combination of steps comprising:

forming a generally tubular shaped coupling having two facing and axially spaced apart tapered bowls therein;

mounting said coupling over the end of said pipe in an underwater location with said bowls being radially adjacent said pipe;

supporting a plurality of wedged shaped gripping slips in the annular space between said coupling and said pipe at circumferentially spaced about positions adjacent each of said bowls, with each of said slips having a tapered outer surface matching the taper of said adjacent bowl whereby said slip is arranged for being cammed radially inward by said bowl when said slip is urged axially therealong;

and moving said slips in each of said pluralities varying axial and radial distances into gripping engagement with said pipe by applying an axial biasing force to each of said slips, whereby said slips in each of said pluralities are all urged to gripping positions to substantially uniform gripping engagement with the adjacent pipe surface regardless of any variations in size of the annular space between said coupling and said pipe.

2. The invention as claimed in claim 1 wherein said application of an axial biasing force includes:
mounting an annular elastomeric member proximate the butt ends of each of said plurality of slips;
and axially compressing said elastomeric members, whereby each of said members applies an axial biasing force to said slips in one of said pluralities of slips.

3. The invention as claimed in claim 2 wherein said elastomeric members are axially compressed by:
mounting a deformable thrust ring adjacent each axial end of each of said elastomeric members,
and applying said axial force to said thrust rings.

4. The invention as claimed in claim 3 wherein said axial force is applied to said thrust rings by:
supporting a plurality of axially movable pistons adjacent the axial ends of said two most adjacent thrust rings;
and applying fluid pressure to said pistons to urge several of said pistons against each of said thrust rings, to thereby axially compress said elastomeric members and urge said slips to the seating positions.

5. In a method of joining two pipes in an underwater environment wherein said pipes to be joined are positioned in generally horizontal end-to-end relationship, the combination of steps comprising:
forming a generally tubular assemblage having a pair of facing and axially spaced apart tapered bowls proximate each end thereof;
mounting said assemblage over the ends of said pipes in said underwater location with one of said pair of bowls being radially adjacent one of said pipes and the other of said pair of bowls being radially adjacent the other of said pipes;
supporting a plurality of gripping slips at circumferentially spaced about positions adjacent each of said bowls, with each of said slips having a tapered outer surface matching the taper of said adjacent bowl, whereby said slip is arranged for being cammed radially inward by said bowl when said slip is urged axially therealong;
moving said slips varying axial and radial distances into gripping engagement with said pipe by applying an axial force to said slips whereby said slips are all urged to gripping positions to substantially uniform gripping engagement with the adjacent pipe regardless of any variations in size of the annular spaces between said housing and said pipe.

6. In apparatus for making a connection to the end of a generally horizontally extending pipe in an underwater environment, the improvement comprising:
a tubular coupling arranged for mounting over the end of said pipe, said coupling having two axially spaced apart and facing tapered bowls formed therein;
said coupling having a plurality of longitudinally aligned cylinders circumferentially spaced about intermediate said bowls;
at least one axially slidable piston mounted in each of said cylinders, with each of said pistons being arranged to move in an axial direction in response to hydraulically actuated force applied thereto;
a plurality of wedged shaped slips circumferentially spaced about and mounted adjacent each of said bowls, with each of said slips having a tapered outer surface arranged for mating with the taper of said adjacent bowls and a gripping surface on the radially inward side thereof;
a pair of elastomeric annular members mounted in the annular space between said coupling and said pipe, with each of said members being axially proximate one of said pluralities of slips on one end thereof and with the other end thereof being proximate the ends of several of said pistons;
a pair of deformable thrust rings mounted in said annular space between said coupling and said pipe, with each of said rings being arranged for abutment against one of said elastomeric members on one side thereof and arranged for contact by several of said pistons on the other end thereof;
and means for applying hydraulically actuated force to said coupling, to thereby urge several of said pistons in said plurality of pistons in one axial direction against one of said thrust rings and several of said pistons in the opposite axial direction against the other of said thrust rings, to thereby axially deform said thrust rings, axially compress said elastomeric members, and urge each of said slips in each of said plurality of slips varying axial and radial distances into gripping engagement with said pipe regardless of any variations in the size of said annular space between said coupling and said pipe.

7. The invention as claimed in claim 6 including:
another pair of deformable thrust rings mounted in said annular space, with each of said other pair of rings being supported between one of said elastomeric members and one of said pluralities of slips.

* * * * *